July 9, 1963
B. S. SAMPLE
3,096,578
METHOD OF CASTING BRAKE SHOE TO LINING
Filed Feb. 16, 1959
2 Sheets-Sheet 1
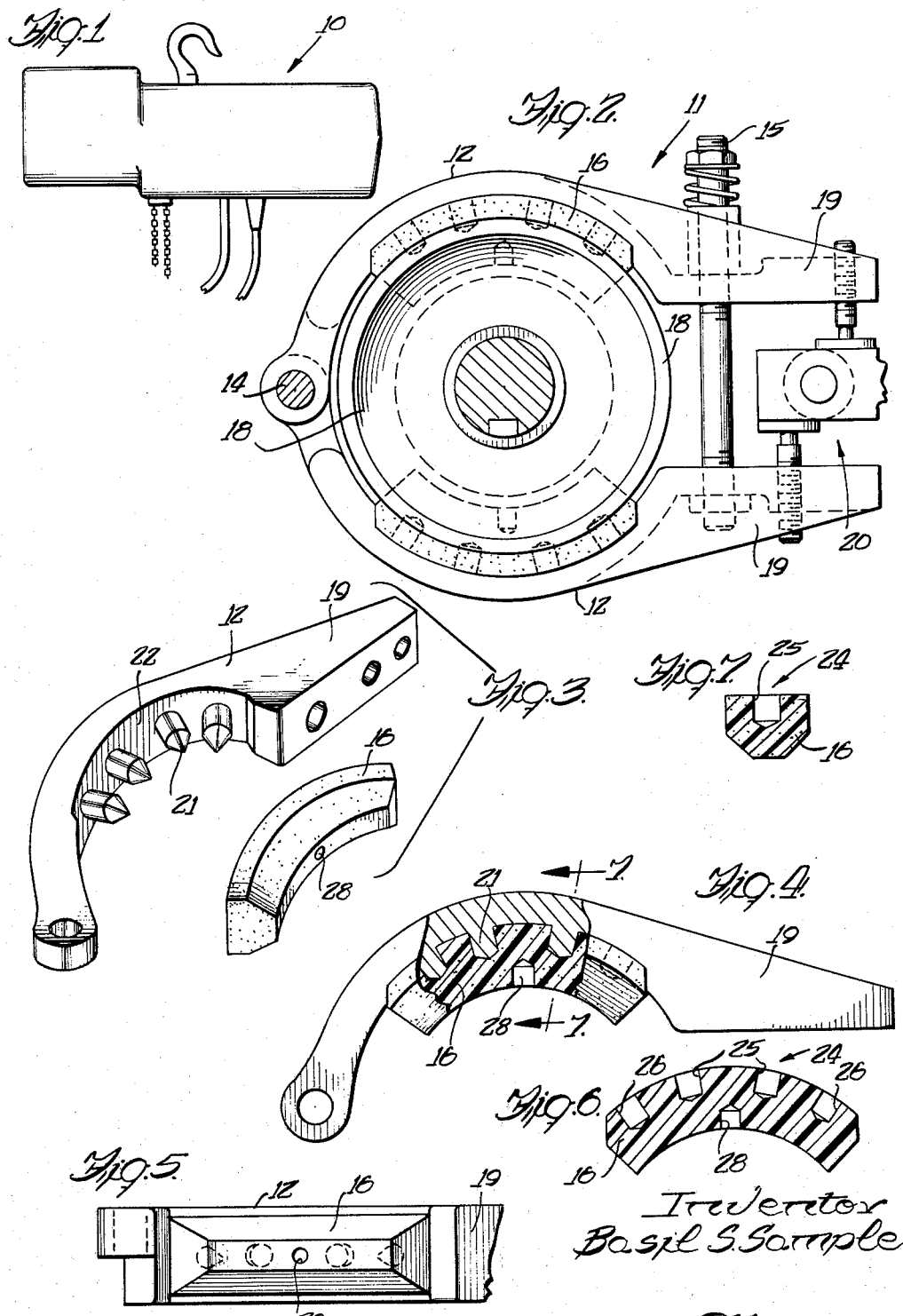
Inventor
Basil S. Sample
Attorney July 9, 1963  B. S. SAMPLE  3,096,578
METHOD OF CASTING BRAKE SHOE TO LINING
Filed Feb. 16, 1959  2 Sheets-Sheet 2

Inventor
Basil S. Sample

Attorney

United States Patent Office 3,096,578
Patented July 9, 1963

3,096,578
METHOD OF CASTING BRAKE SHOE TO LINING
Basil S. Sample, Danville, Ill., assignor to Duff-Norton Company, Pittsburgh, Pa.
Filed Feb. 16, 1959, Ser. No. 793,468
3 Claims. (Cl. 29—527)

The present invention relates to a brake shoe and lining, as well as a method for making such brake shoe and lining. As illustrated, the device finds particular utility in a safety brake for an electric hoist, but it will be obvious as the following description proceeds that a wide usage is possible.

Heretofore brakes of all types have been employed where the lining is riveted to the brake shoe, or in some instances affixed to the brake shoe by means of various adhesives, or a combination of both.

In all such illustrations, careful alinement is required so that the rivets are coordinated with the holes in the lining, and the lining is properly placed and spaced on the shoe. In the event the lining becomes worn, the lining is usually replaced by drilling out or otherwise rendering the rivets ineffectual and re-assembling.

Where V-shaped linings are involved, the problem of assembly becomes more difficult since the lining is deeper, and holes bored therethrough remove large portions of the lining material.

With the foregoing in mind, it is the principal object of the present invention to provide a brake shoe and lining which have an integral interlocking relationship providing an excellent bond between the two. A closely related object of the invention is to furnish a method for making a brake shoe and lining by casting the brake shoe directly to the lining.

A more detailed object of the invention is to provide a brake shoe and lining which eliminates riveting and/or the necessity of applying an adhesive at the interface between the lining and brake shoe.

Another object of the invention is to provide a brake shoe and lining, the face of which is substantially uninterrupted by access holes necessitated by a riveted type of attachment.

Still another object of the invention is to provide a brake shoe and lining of a character which is able to withstand the shock loads of safety braking which might otherwise loosen or render ineffectual attachment by mushroom head rivets.

A further general object of the invention is to furnish a brake shoe and lining which is sufficiently economical to manufacture that it can be thrown away when the lining is worn, thereby reducing the cost of relining to the cost of a replacement brake shoe and lining.

Further objects and advantages of the present invention will become apparent as the description of an illustrative embodiment proceeds, taken in conjunction with the accompanying drawings, in which:

FIGURE 1 is a general outline of a typical electric hoist in which a safety brake exemplary of the subject invention may be advantageously employed.

FIG. 2 is a partially diagrammatic front elevation of a safety brake having a brake shoe and lining illustrative of the subject invention.

FIG. 3 is a partially exploded perspective view of one of the subject brake shoes and lining therefor.

FIG. 4 is a front elevation partially sectioned showing the contiguous interlock between the brake shoe and lining.

FIG. 5 is a partially broken view taken from beneath the elevation shown in FIG. 4, and shows in phantom lines the interlocking members between the brake shoe and lining.

FIG. 6 is a longitudinal section of the brake lining in reduced scale illustrating the positioning of the pockets.

FIG. 7 is a transverse sectional view through the brake lining taken along section line 7—7 of FIG. 4.

Figure 8:
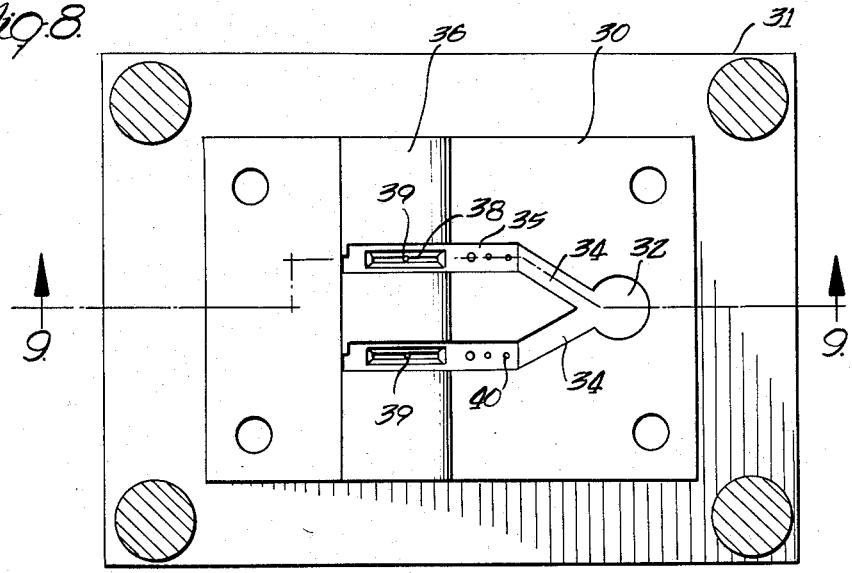
FIG. 8 is a plan view of a mold for die casting the subject brake shoes directly to the linings.
Figure 9:
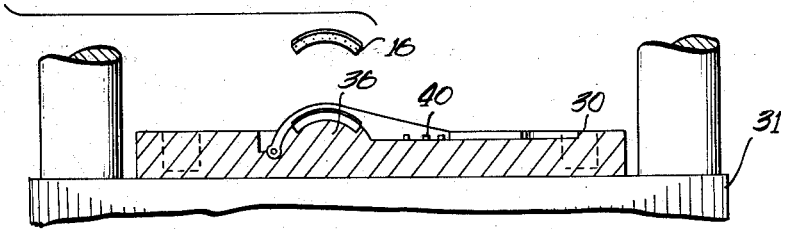
FIG. 9 is a transverse partially sectioned, partially broken, partially diagrammatic view of the die shown in FIG. 8 taken along section line 9—9 thereof.
Figure 10:
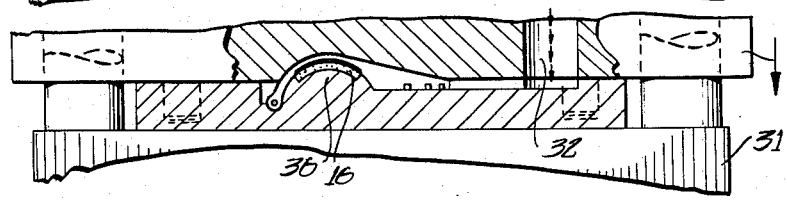
FIG. 10 is a view of the die corresponding to FIG. 9 except showing the upper portion of the mold in contact with the lower portion just prior to molding.
Figure 11:
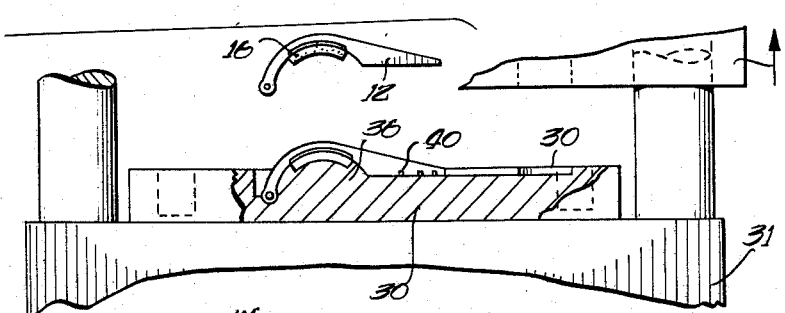
FIG. 11 is a view of the die similar to FIG. 10 but subsequently showing the parting of the two members and the removal of the completed brake shoe and lining.

It will be apparent as the following description proceeds that a brake shoe and lining of the character disclosed could be made by methods other than the simultaneously casting method which will be described. By the same token, it is conceivable that the simultaneous casting method described could be employed to make other types of brake shoes. Commercial results have indicated, however, that substantial economies and excellent uniformity of product have been achieved by employing the method of the present invention in making the product of the present invention.

*Brake Shoe and Lining*

For a complete understanding of the method of manufacture, it will be best to first examine the product. As pointed out above, safety brakes are almost invariably required in electric hoists of the character shown in FIGURE 1 indicated by the reference numeral 10. Such a safety brake 11 is shown in greater detail in FIG. 2, where it will be seen that the brake involves a pair of opposed brake shoes and linings which are joined at a single pivot 14 at one end and biased by a spring loaded bolt 15 at the other end. In the example shown, the brake lining 16 has a generally V-shaped cross sectional configuration adapted to cooperate with the V groove in the pulleylike brake drum 18. In such safety brakes as shown in FIG. 2, the brake is normally set, that is, the lining 16 is normally held under spring pressure in contact with the brake drum 18. The jaws 19 of the brake shoe 12 may be quickly separated by means of an unlocking mechanism 20 and just as quickly reset. It will be appreciated that in such action under heavy loads, considerable shock is applied to the brake shoe and lining, and that this shock is both radial and curvilinear in nature. Consequently it is highly desirable that the interlock between the lining and brake shoe be sturdy and permanent in nature.

As will be seen in FIGS. 3 and 4, this interlock is achieved by means of radially spaced extensions 21 which project outwardly from the semi-circular lining support face 22 of the brake shoe 12. The projections 21 are received in complementary pockets 24 which are either bored or otherwise formed in the brake lining 16 (see FIG. 6).

In a successful commercial embodiment the radial spacing between the inside pockets 25 is on a 30° spacing, and between the inside and outside pockets 26 is on a 25° spacing. The centering pocket 28 is spaced midway between the two center pockets 25. A total of 80° is the included angle between the intersection of the centers of the outside pockets 26. It will be observed that the projections 21 extend to approximately half the depth of the brake lining 16 and that similarly the centering pocket 28 extends to approximately half the depth of the lining 16.

Figure 12:
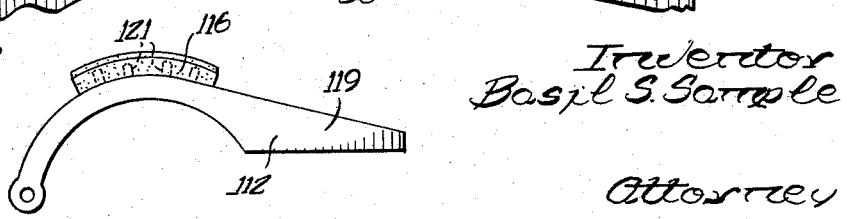
FIG. 12 is a front elevation of an alternative embodiment of the brake shoe and lining.

Although the brake shoe and lining described in detail has the lining "inside" the curved shoe, as will be seen in FIG. 12, the lining can just as easily be on the outside of the shoe. In addition, with a suitable undercut in the forming of the pockets in the brake shoe lining, a flat lining and shoe can be employed in the method of the invention.

The brake lining 16 contains the following general analysis:

Asbestos—approximately 57%.
Combustible material (phenolic resin binders)—approximately 30%.
Non-combustible friction particles—approximately 13%.
Metallic material—none.
Temperature of destruction—constant operation at temperatures exceeding 500° F.

The material employed in casting the brake shoe 19 is an aluminum alloy, preferably SAE 308.

Method Casting Brake Shoe to Lining

In order to cast a lining directly to a brake shoe, a die 30 is employed in a pressure type die casting machine 31 which provides for a pressurized shot of molten metal to be injected in a pressure chamber 32 and thereafter directed by means of channels 34 to the molding recess 35. The molding recess 35 traces around a semi-circular portion 36 with pre-cut grooves 38 to receive the lining 16 and having locating pins 39 which project into a locating pocket in the lining 16.

In the method of manufacture, a mold release agent is initially sprayed on the die 30, the mold release agent found satisfactory being sold in the trade as "Die Slick." The brake shoe linings 16 are then manually placed with their locating pockets registering with the locating pins 39. The mold 30 is preheated to a temperature of approximately 600° F. to 700° F. and held there throughout the molding cycle. The mold can be cooled by radiation, but water channels may be provided in the event additional cooling becomes necessary.

The molten aluminum alloy at a temperature between 1180° F. and 1280° F. is poured manually into the pressure chamber 32 after the mold has been closed. The pressure plunger is then advanced to force the material into the die at a pressure of approximately 1000 p.s.i. This pressure is maintained with the die closed for approximately twelve seconds. Thereafter the die 30 is opened and ejection pins 40 are employed to release the brake shoe 12 and its then integrally affixed lining 16 from the mold. The finished parts are removed manually and the sprue broken from the finished parts.

There does not appear to be any bonding between the metal and the brake lining at the interface. With the temperatures and times employed as indicated above, subsequently broken away linings do not exhibit destruction due to heat at the interface. A resistance to curvilinear dislocation takes place, however, attributable to the minute and discreet complementary relationship between the surface irregularities of the lining and the subsequently cast adjacent thereto brake shoe. The invention, however, is independent of the foregoing expressed theories which are extrapolated from physically observed results of a successful commercial operation.

Although one embodiment of the device contemplated by the present invention has been shown and also one embodiment of the method contemplated by the present invention has been shown and described in detail, it is not intended that the invention be limited thereto, but to the spirit and scope of the invention as expressed in the entire disclosure and the appended following claims:

I claim:
1. The method of casting a brake shoe to, and radially to one side of, a semi-circular lining, comprising the steps of forming radially spaced and oriented pockets extending from one side partially through the lining, spraying die release in a pressure casting die adapted to receive the lining and form the brake shoe contiguous to the lining, placing the lining in the pressure casting die, preheating the die to a temperature within the range of 600° F. to 700° F., forcing molten metal into the brake shoe forming portion of the die contiguous to said one side of the lining at a pressure approximating 1000 p.s.i., maintaining the pressure from 10 to 15 seconds, opening the die after pressure is released and the molten metal flow cut off and removing the cast shoe and integral lining therefrom.

2. The method of casting a brake shoe to one radial side of a partially circular lining, comprising the steps of forming a plurality of radial pockets extending from one face partially through the lining, forming a radial centering pocket extending from the braking surface of the lining partially through the lining, providing a die adapted to receive the lining and having a locating pin, disposing the lining in said die with said locating pin inserted in said centering pocket, said die being further adapted to form the brake shoe contiguous to said one face of the lining, introducing molten metal into the brake shoe forming portion of the die adjacent to said one face whereby said metal flows into said plurality of said radial pockets and forms a brake arm integral therewith, and opening the die after metal has chilled and unloading the cast shoe and the lining from the locating pin and the die.

3. A method in accordance with claim 2 wherein all of said radial pockets extending from one face have a cylindrical portion defined thereby adjacent said one face, whereby the portion of the metal flowing thereinto forms a generally cylindrical stud.

References Cited in the file of this patent

UNITED STATES PATENTS

| | | |
|---|---|---|
| 1,652,468 | Catlin | Dec. 13, 1927 |
| 1,709,129 | Hay | Apr. 16, 1929 |
| 1,812,028 | Whitworth | June 30, 1931 |
| 1,817,570 | Latimer | Aug. 4, 1931 |
| 1,822,430 | Blume | Sept. 8, 1931 |
| 1,893,427 | McDonald | Jan. 3, 1933 |
| 1,927,012 | Blume | Sept. 19, 1933 |
| 1,956,462 | Knuth | Apr. 24, 1934 |
| 1,974,561 | Cunningham | Sept. 25, 1934 |
| 2,055,335 | Carnes | Sept. 22, 1936 |
| 2,067,677 | Murphy | Jan. 12, 1937 |
| 2,476,151 | Jeune | July 12, 1949 |
| 2,923,041 | Ryznar | Feb. 2, 1960 |

OTHER REFERENCES

"The Metallurgy of Aluminum and Aluminum Alloys," by Robert J. Anderson, published by Henry Carey Baird and Company, Inc., 1925. Page 621 relied on.